US011043684B2

(12) United States Patent
Jahnke et al.

(10) Patent No.: US 11,043,684 B2
(45) Date of Patent: Jun. 22, 2021

(54) FUEL CELL SYSTEM HAVING ENHANCED $CO_2$ CAPTURE

(71) Applicant: FuelCell Energy, Inc., Danbury, CT (US)

(72) Inventors: Fred C. Jahnke, Rye, NY (US); Matthew Lambrech, Sherman, CT (US)

(73) Assignee: FuelCell Energy, Inc., Danbury, CT (US)

( * ) Notice: Subject to any disclaimer, the term of this patent is extended or adjusted under 35 U.S.C. 154(b) by 331 days.

(21) Appl. No.: 15/980,291

(22) Filed: May 15, 2018

(65) Prior Publication Data

US 2018/0261864 A1    Sep. 13, 2018

Related U.S. Application Data

(63) Continuation of application No. PCT/US2016/061981, filed on Nov. 15, 2016.
(Continued)

(51) Int. Cl.
*H01M 8/0668* (2016.01)
*C01B 3/16* (2006.01)
(Continued)

(52) U.S. Cl.
CPC ........ *H01M 8/0668* (2013.01); *B01D 53/326* (2013.01); *B01D 53/62* (2013.01);
(Continued)

(58) Field of Classification Search
None
See application file for complete search history.

(56) References Cited

U.S. PATENT DOCUMENTS

| 3,094,390 A | 6/1963 | Vander |
| 3,180,813 A * | 4/1965 | Wasp ................... C25B 1/04 |
| | | 205/343 |

(Continued)

FOREIGN PATENT DOCUMENTS

| CA | 1242985 A | 8/1985 |
| CA | 2937948 A | 8/2015 |

(Continued)

OTHER PUBLICATIONS

Hu et al., "Electrochemical performance of reversible molten carbonate fuel cells", International Journal of Hydrogen Energy, vol. 39, Issue 23, Aug. 4, 2014, pp. 12323-12329 (Year: 2014).*

(Continued)

*Primary Examiner* — Ula C Ruddock
*Assistant Examiner* — Anna Korovina
(74) *Attorney, Agent, or Firm* — Foley & Lardner LLP

(57) ABSTRACT

A carbon dioxide capture system for removing carbon dioxide from a flue gas produced by a combustion power plant. The system includes an electrolyzer cell configured to receive a flue gas comprising carbon dioxide and output a first exhaust stream comprising an enriched flue gas comprising carbon dioxide. The system further includes a fuel cell configured to receive the first exhaust stream and output a second exhaust stream comprising carbon dioxide. The second exhaust stream contains a higher concentration of carbon dioxide than the first exhaust stream.

13 Claims, 2 Drawing Sheets

Related U.S. Application Data

(60) Provisional application No. 62/256,484, filed on Nov. 17, 2015.

(51) Int. Cl.

| | | |
|---|---|---|
| *C25B 1/04* | (2021.01) | |
| *H01M 8/0656* | (2016.01) | |
| *B01D 53/32* | (2006.01) | |
| *C25B 15/08* | (2006.01) | |
| *B01D 53/62* | (2006.01) | |
| *H01M 8/14* | (2006.01) | |

(52) U.S. Cl.
CPC .............. *C01B 3/16* (2013.01); *C25B 1/04* (2013.01); *C25B 15/08* (2013.01); *H01M 8/0656* (2013.01); *B01D 2257/504* (2013.01); *C01B 2203/0233* (2013.01); *C01B 2203/0283* (2013.01); *C01B 2203/066* (2013.01); *C01B 2203/067* (2013.01); *H01M 2008/147* (2013.01); *H01M 2250/10* (2013.01); *Y02B 90/10* (2013.01); *Y02C 20/40* (2020.08); *Y02E 60/36* (2013.01); *Y02E 60/50* (2013.01); *Y02P 20/151* (2015.11)

(56) References Cited

U.S. PATENT DOCUMENTS

| | | |
|---|---|---|
| 4,849,091 A | 7/1989 | Cabrera et al. |
| 5,071,719 A | 12/1991 | Rostrup-Nielsen et al. |
| 5,346,613 A | 9/1994 | Lomas et al. |
| 5,346,778 A | 9/1994 | Ewan et al. |
| 5,413,878 A | 5/1995 | Williams et al. |
| 5,711,770 A | 1/1998 | Malina |
| 5,928,806 A * | 7/1999 | Olah .................. C25B 3/04 |
| | | 204/DIG. 4 |
| 6,187,465 B1 | 2/2001 | Galloway |
| 7,070,874 B2 | 7/2006 | Blanchet et al. |
| 7,150,927 B2 | 12/2006 | Hickey et al. |
| 7,201,979 B2 | 4/2007 | McElroy et al. |
| 7,323,270 B2 | 1/2008 | Patel et al. |
| 7,353,085 B2 | 4/2008 | Rusta-Sallehy et al. |
| 7,364,810 B2 | 4/2008 | Sridhar et al. |
| 7,396,603 B2 | 7/2008 | Farooque et al. |
| 7,422,810 B2 | 9/2008 | Venkataraman et al. |
| 7,482,078 B2 | 1/2009 | Sridhar et al. |
| 7,575,822 B2 | 8/2009 | Mitlitsky et al. |
| 7,704,618 B2 | 4/2010 | Venkataraman et al. |
| 7,781,112 B2 | 8/2010 | Sridhar et al. |
| 7,833,668 B2 | 11/2010 | Ballantine et al. |
| 7,846,599 B2 | 12/2010 | Ballantine et al. |
| 7,878,280 B2 | 2/2011 | Sridhar et al. |
| 7,887,971 B2 | 2/2011 | Hickey et al. |
| 7,901,814 B2 | 3/2011 | Venkataraman et al. |
| 8,053,136 B2 | 11/2011 | Hickey et al. |
| 8,071,241 B2 | 12/2011 | Sridhar et al. |
| 8,071,246 B2 | 12/2011 | Mitlitsky et al. |
| 8,277,992 B2 | 10/2012 | Mitlitsky et al. |
| 8,435,689 B2 | 5/2013 | Venkataraman |
| 8,663,859 B2 | 3/2014 | Mitlitsky et al. |
| 8,852,820 B2 | 10/2014 | Perry et al. |
| 9,190,693 B2 | 11/2015 | Sridhar et al. |
| 9,413,017 B2 | 8/2016 | Bandhauer et al. |
| 9,478,819 B2 | 10/2016 | Lambrech et al. |
| 9,722,273 B2 | 8/2017 | Perry et al. |
| 9,911,989 B2 | 3/2018 | McElroy et al. |
| 9,947,955 B2 | 4/2018 | Sridhar et al. |
| 10,096,840 B1 | 10/2018 | Venkataraman et al. |
| 10,361,442 B2 | 7/2019 | Perry et al. |
| 10,581,090 B2 | 3/2020 | Ballantine et al. |
| 2002/0004154 A1 | 1/2002 | Pastula et al. |
| 2004/0180249 A1 | 9/2004 | Pham et al. |
| 2004/0185313 A1 | 9/2004 | Halter |
| 2004/0202914 A1 | 10/2004 | Sridhar et al. |
| 2005/0058863 A1 | 3/2005 | Wang et al. |
| 2005/0112425 A1 | 5/2005 | Hsu |
| 2005/0123810 A1 | 6/2005 | Balan |
| 2005/0197743 A1 | 9/2005 | Rusta-Sallehy et al. |
| 2005/0271914 A1 | 12/2005 | Farooque et al. |
| 2006/0140823 A1 | 6/2006 | Katikaneni et al. |
| 2006/0248800 A1 | 11/2006 | Miglin et al. |
| 2008/0060935 A1 | 3/2008 | Hartvigsen |
| 2008/0075990 A1 | 3/2008 | Isozaki et al. |
| 2008/0155984 A1 | 7/2008 | Liu et al. |
| 2008/0314741 A1 | 12/2008 | Balestrino et al. |
| 2009/0110989 A1 | 4/2009 | Daly et al. |
| 2009/0158662 A1 | 6/2009 | Towler |
| 2009/0226775 A1 | 9/2009 | Jahnke et al. |
| 2009/0235587 A1 | 9/2009 | Hawkes et al. |
| 2010/0047641 A1 | 2/2010 | Jahnke et al. |
| 2010/0215566 A1 * | 8/2010 | Lourenco ............... F25J 1/0229 |
| | | 423/437.1 |
| 2010/0266923 A1 | 10/2010 | McElroy et al. |
| 2010/0304228 A1 | 12/2010 | Majarov et al. |
| 2011/0104577 A1 | 5/2011 | Cui et al. |
| 2011/0189567 A1 | 8/2011 | Venkataraman et al. |
| 2012/0068661 A1 * | 3/2012 | Fracas ............... H01M 8/04776 |
| | | 320/101 |
| 2013/0052548 A1 | 2/2013 | Nedergaard Clausen et al. |
| 2013/0108936 A1 | 5/2013 | McElroy et al. |
| 2013/0126038 A1 | 5/2013 | Jamal et al. |
| 2013/0177824 A1 | 7/2013 | Cui et al. |
| 2013/0251598 A1 | 9/2013 | Gil et al. |
| 2013/0260268 A1 | 10/2013 | Shapiro et al. |
| 2014/0076213 A1 | 3/2014 | Ingram et al. |
| 2014/0080076 A1 | 3/2014 | Lutz |
| 2014/0093798 A1 | 4/2014 | Snyder et al. |
| 2014/0272626 A1 | 9/2014 | Berlowitz et al. |
| 2014/0272629 A1 | 9/2014 | Berlowitz et al. |
| 2015/0280265 A1 | 10/2015 | McLarty |
| 2016/0344045 A1 | 11/2016 | Ishino et al. |
| 2016/0351930 A1 | 12/2016 | Jahnke et al. |
| 2020/0161671 A1 | 5/2020 | Ballantine et al. |

FOREIGN PATENT DOCUMENTS

| | | |
|---|---|---|
| CN | 101427408 A | 5/2009 |
| CN | 104847424 A | 8/2015 |
| CN | 106133973 A | 11/2016 |
| DE | 10 2012 206 541 A1 | 10/2013 |
| EP | 1 620 906 | 2/2006 |
| EP | 1 665 441 | 6/2006 |
| EP | 2 784 187 A1 | 10/2014 |
| EP | 3 054 519 A1 | 8/2016 |
| JP | 51-008405 A | 1/1976 |
| JP | 60-235893 | 11/1985 |
| JP | 06-005301 A | 1/1994 |
| JP | 11-169661 A | 6/1999 |
| JP | 11-223475 A | 8/1999 |
| JP | 2002-319428 | 10/2002 |
| JP | 2004-099927 A | 4/2004 |
| JP | 2004-311159 A | 11/2004 |
| JP | 2007-162531 | 6/2007 |
| JP | 2007-523443 | 8/2007 |
| JP | 2008-507113 | 3/2008 |
| JP | 2009-517547 | 4/2009 |
| JP | 2010-013333 A | 1/2010 |
| JP | 2010-518559 A | 5/2010 |
| JP | 2010-129286 | 6/2010 |
| JP | 2010-212141 A | 9/2010 |
| JP | 2010-228963 | 10/2010 |
| JP | 2012-514039 | 6/2012 |
| JP | 2014-198789 | 10/2014 |
| JP | 2005-293934 A | 10/2015 |
| JP | 6096790 B2 | 3/2017 |
| JP | 2017-511956 | 4/2017 |
| KR | 1020070057131 A | 6/2007 |
| KR | 10-2011-0114816 | 10/2011 |
| KR | 1020160114632 A | 10/2016 |
| WO | WO-01/04045 | 1/2001 |
| WO | WO-2007/015689 A2 | 2/2007 |
| WO | WO-2009/031747 A1 | 3/2009 |
| WO | WO-2010/021997 A2 | 2/2010 |

(56) References Cited

FOREIGN PATENT DOCUMENTS

| WO | WO-2013/029701 A1 | 3/2013 |
|---|---|---|
| WO | WO-2015/116964 A1 | 8/2015 |
| WO | WO-2015/153064 A1 | 10/2015 |
| WO | WO-2017/087405 A1 | 5/2017 |

OTHER PUBLICATIONS

Moreno et al., International Status of Molten Carbonate Fuel Cell (MCFC) Technology, Jan. 2008 (Year: 2008).*
Kasai et al., "High Temperature Electrochemical Separation of Carbon Dioxide Using Molten Carbonate", Denki Kagaku, 66, No. 6, 1998, p. 635-640; (Year: 1998).*
Campanari et al., "Using MCFC for high efficiency CO2 capture from natural gas combined cycles: Comparison of internal and external reforming", Applied Energy 112 (2013) 772-783), (Year: 2013).*
Wang et al., "The intensification technologies to water electrolysis for hydrogen production—A review", Renewable and Sustainable Energy Reviews 29 (2014) 573-588 (Year: 2014).*
Millet et al., "Chapter 2—Water Electrolysis Technologies", Renewable Hydrogen Technologies, 2013 (Year: 2013).*
Itou et al., "High Efficency CO2 Separation and Concentration System by Using Molten Carbonate", Greenhouse Gas Control Technologies—6th International Conference Proceedings of the 6th International Conference on Greenhouse Gas Control Technologies Oct. 2002, Kyoto, Japan vol., pp. 1331-133 (Year: 2002).*
Mirko Filipponi et al., "Use of Molten Carbonate Fuel Cell for CO2 Capture", ECS Transactions, 42 (1) 43-47 (2012), 10.1149/1. 4705478. (Year: 2012).*
Amorelli et al., "An experimental investigation into the use of molten carbonate fuel cells to capture CO2 from gas turbine exhaust gases", Energy 29 (2004) 1279-1284, doi:10.1016/j.energy.2004. 03.087 (Year: 2004).*
Translation of Baranov et al., "The Opportunities of Electrochemical Air Regeneration Technology On the Base of Molten Carbonate Fuel Cells", Chemical Industry Today, 9, 3, 2016, 3-14 (Year: 2016).*
Caprile et al.; "Carbon capture: Energy wasting technologies or the MCFCs challenge?" International Journal of Hydrogen Energy; 2011 ;36:10269-10277.
Desideri et al.; "MCFC-based $CO_2$ capture system for small scale CHP plants." International Journal of Hydrogen Energy. 2012;37: 19295-19303.
Extended European Search Report dated Oct. 26, 2018 for EP18182210.7 (8 pages).
Extended European Search Report in EP 15744017.3 dated Aug. 16, 2017 (12 pages).
Heidenbrecht et al., "Molten Carbonate Fuel Cell (MCFC) with Internal Reforming: model-based analysis of cell dynamics", Chemical Engineering Science, vol. 58, issues 3-6, 2003, pp. 1029-1036.
International Preliminary Report on Patentability issued in corresponding application No. PCT/US2015/013837 dated Aug. 2, 2016.
International Search Report and Written Opinion dated May 6, 2014 in PCT/US2015/013837 (13 pages).
International Search Report and Written Opinion dated Jul. 19, 2017 for PCT/US17/28321 (16 pages).
International Search Report and Written Opinion dated Jul. 26, 2017 in PCT/US17/30230 (13 pages).
International Search Report and Written Opinion in PCT/US/16/ 62276, dated Jan. 31, 2017 (8 pages).
International Search Report and Written Opinion in PCT/US16/ 62069 dated Jan. 27, 2017 (10 pages).
International Search Report and Written Opinion on PCT/US16/ 62083, dated Jan. 31, 2017, 8 pages.
Kasai, "$CO_2$ Electrochemical Separation by Molten Carbonate Technology," Fuel Chemistry Division Preprints, 2002, 47(1 ), 69-70.
Non-Final Office Action on U.S. Appl. No. 15/115,186 dated Dec. 31, 2018 (7 pages).
Notice of Preliminary Rejection for KR App;. No. 10-2018-7016035 dated Nov. 12, 2018, with English translation (14 pages).
Notice of Preliminary Rejection for KR Appl. No. 10-2018-7017810 dated Nov. 12, 2018, with English translation (13 pages).
Notice of Preliminary Rejection for KR Appl. No. 10-2018-7017811 dated Nov. 12, 2018, with English translation (13 pages).
Notification of the First Office Action for CN201580009634.6 dated May 4, 2018, with English translation (15 pages).
Office Action for KR 10-2018-7016036 dated Nov. 12, 2018, with English translation (13 pages).
Office Action in JP 2018-116336 dated Sep. 21, 2018, with English translation (7 pages).
Office Action in JP 2018-525361 dated Sep. 21, 2018, with English translation (6 pages).
Office Action issued in JP 2016-549225, dated Sep. 25, 2017, with English translation (9 pages).
Office Action received in JP 2018-133361 dated Dec. 10, 2018, with English translation (8 pages).
Office Action received in JP 2018-133362 dated Dec. 7, 2018, with English translation (6 pages).
Office Action received in JP 2018-525359 dated Dec. 10, 2018, no English translation available (4 pages ).
Second Office Action issued in CA2937948 dated Jun. 11, 2018 (4 pages).
International Search Report and Written Opinion for PCT/US16/ 61981 dated Jan. 19, 2017 (8 pages).
Extended European Search Report received in EP18182124.0 dated Dec. 7, 2018 (6 pages).
International Search Report and Written Opinion in PCT/IB2018/ 058968 dated Jan. 23, 2019 (16 pages).
International Search Report and Written Opinion in PCT/IB2018/ 059191 dated Mar. 27, 2019 (20 pages).
Office Action in JP2018-116336 dated Mar. 26, 2019 with English translation (8 pages).
Office Action in JP2018-525557 dated May 24, 2019, with English translation (14 pages).
Third Office Action in JP 2018-116336 dated Dec. 20, 2019, with English translation (9 pages).
Extended European Search Report in EP16866931 dated May 2, 2019 (10 pages).
Extended European Search Report in EP16867038.8 dated Jun. 27, 2019 (8 pages).
Extended European Search Report on EP16866959.6 dated May 3, 2019 (10 pages).
Extended European Search Report received in EP16866965.3, dated Jun. 17, 2019 (7 pages).
Manuel, B. et al., Power to Gas-biomass oxycombustion hybrid system: Energy integration and potential applications, Applied Energy, Elsevier Science Publishers, GB, vol. 167, Oct. 16, 2015, pp. 221-229.
Non-Final Office Action on U.S. Appl. No. 15/815,556 dated Oct. 28, 2019.
Notice of Allowance on U.S. Appl. No. 15/980,356 dated Sep. 24, 2019.
First Office Action in CN 2016800735683 dated Aug. 3, 2020, with English translation (16 pages).
Non-Final Office Action on U.S. Appl. No. 16/266,699 dated Oct. 16, 2020.

* cited by examiner

FUEL CELL SYSTEM HAVING ENHANCED $CO_2$ CAPTURE

CROSS-REFERENCE TO RELATED APPLICATIONS

This application is a Continuation of International Application No. PCT/US2016/061981, filed Nov. 15, 2016, which claims the benefit of priority to U.S. Provisional Patent Application No. 62/256,484, filed Nov. 17, 2015. The entire disclosures of International Application No. PCT/US2016/061981 and U.S. Provisional Patent Application No. 62/256,484 are incorporated herein by reference.

STATEMENT OF GOVERNMENT RIGHTS

This invention was made with Government support under Cooperative Agreement DE-EE0006669 awarded by the United States Department of Energy. The Government has certain rights in the invention.

BACKGROUND

The present disclosure relates to fuel cell systems for the production of electricity. In particular, the present disclosure relates to a fuel cell system capable of enhanced $CO_2$ capture.

Combustion power plants produce energy through the combustion of fossil fuels, such as coal, oil, or natural gas. During the combustion process, exhaust, in the form of a flue gas, is produced and often vented into the atmosphere. However, the flue gas produced during the combustion process contains many contaminants, such as carbon dioxide. These contaminants are known to adversely affect the environment by contributing to overall climate change. As such, in recent years, many government regulatory bodies have required the reduction in emissions of these contaminants, in particular carbon dioxide, into the atmosphere.

Given the recognition of the harmful effect of carbon dioxide release and recent restrictions on its emission, efforts have been made to efficiently remove carbon dioxide in a purified form from a flue gas produced by a combustion power plant. By removing carbon dioxide from the flue gas, the carbon dioxide alternatively may be used for other, safer purposes, such as underground storage or oil production needs.

Current methods for $CO_2$ capture from flue gas, however, are highly inefficient. This is due, in part, to the dilute concentration of carbon dioxide present in the flue gas, which can be as little as 5% in concentration. As such, conventional systems designed to remove $CO_2$ can be very costly and require a high input of energy to sufficiently remove or reduce the $CO_2$, significantly reducing the production capabilities of the power plant itself.

One known method in which the input energy to remove carbon dioxide from flue gas may be offset is through the use of a fuel cell. A fuel cell is a device that is capable of converting chemical energy stored in a fuel, such as a hydrocarbon fuel, into electrical energy through electrochemical reactions. In particular, a fuel cell, such as a molten carbonate fuel cell (MCFC), can be capable of producing electrical energy from an input supply of a flue gas and selectively removing the carbon dioxide contained in the flue gas as a byproduct. Thus, an exhaust is produced from the fuel cell that contains carbon dioxide in a more concentrated form, which may be as much as about 70%. This concentrated exhaust stream allows for the carbon dioxide to be easily removed without as high of a need of input energy as conventional methods. In addition, because a fuel cell produces electricity as a byproduct of its internal electrochemical reactions, the process in creating the concentrated carbon dioxide stream results in an increase in the overall energy output of the combustion power plant.

However, because flue gas contains carbon dioxide in a diluted form, providing the flue gas as an input supply to the fuel cell results in a lower output of electricity.

SUMMARY

Certain embodiments of the present invention provide a $CO_2$ recovery system that generates flue gas enriched with $O_2$ prior to its input into the fuel cell such that a higher output value may be realized, further offsetting the costs of capturing $CO_2$ from the flue gas and increasing the overall efficiency of the power plant.

In certain embodiments, the $CO_2$ capture system includes compressing and refrigerating the concentrated $CO_2$ stream, producing liquid $CO_2$. Because the $CO_2$ contains non-condensable gases (e.g., $H_2$, CO), an off gas (or exhaust) stream of $H_2$, CO, and $CO_2$ is created, which may be recycled as fuel to the fuel cell or purified to $H_2$ or $H_2$ and CO.

In certain embodiments, a carbon dioxide capture system for removing carbon dioxide from a flue gas produced by a combustion power plant includes an electrolyzer cell configured to receive an off gas comprising carbon dioxide, hydrogen, carbon monoxide, and water and output a first exhaust stream comprising a flue gas comprising oxygen and carbon dioxide and a second exhaust stream containing a high concentration of hydrogen (e.g., greater than 95%), which can be exported as a valuable by-product.

In certain embodiments, a carbon dioxide capture system for removing carbon dioxide from a flue gas produced by a combustion power plant includes an electrolyzer cell configured to receive a flue gas comprising carbon dioxide and output a first exhaust stream comprising an enriched flue gas comprising carbon dioxide. The carbon dioxide capture system further includes a fuel cell configured to receive the first exhaust stream and output a second exhaust stream. The second exhaust stream contains a higher concentration of carbon dioxide than the first exhaust stream.

In one aspect, which is combinable with the above embodiments and aspects, the enriched flue gas further comprises a higher concentration of oxygen than the flue gas.

In one aspect, which is combinable with the above embodiment, the enriched flue gas comprises a higher concentration of carbon dioxide than the flue gas.

In one aspect, which is combinable with the above embodiments and aspects, the electrolyzer cell is a molten carbonate electrolysis cell.

In one aspect, which is combinable with the above embodiments and aspects, the fuel cell is a molten carbonate fuel cell.

In one aspect, which is combinable with the above embodiments and aspects, the electrolyzer cell is configured to produce a third exhaust stream comprising hydrogen.

In one aspect, which is combinable with the above embodiments and aspects, the carbon dioxide capture system further includes a sequester system configured to cool and condense the second exhaust stream such that liquid carbon dioxide is produced.

In one aspect, which is combinable with the above embodiments and aspects, the second exhaust stream comprises about 70% carbon dioxide.

In one aspect, which is combinable with the above embodiments and aspects, the fuel cell is configured to output a fourth exhaust stream that is substantially depleted of carbon dioxide.

In certain embodiments, a carbon dioxide capture system for removing carbon dioxide from a flue gas produced by a combustion power plant includes a fuel cell having a first anode and a first cathode. The first cathode is configured to receive a flue gas comprising carbon dioxide and oxygen and output $CO_2$-depleted flue gas comprising mainly nitrogen and some carbon dioxide and oxygen. The carbon dioxide capture system further includes an electrolysis cell having a second anode and a second cathode. The second anode is configured to receive an off gas from a $CO_2$ liquefaction and output a vent gas of hydrogen. The second cathode outputs $CO_2$ and $O_2$, which enriches the flue gas to the fuel cell.

In one aspect, which is combinable with the above embodiment, the electrolyzer cell is a molten carbonate electrolysis cell and the fuel cell is a molten carbonate fuel cell.

In one aspect, which is combinable with the above embodiments and aspects, the enriched flue gas comprises a higher concentration of oxygen and carbon dioxide than the flue gas.

In one aspect, which is combinable with the above embodiments and aspects, the second anode is configured to output an exhaust gas comprising mainly hydrogen with small amounts of carbon dioxide, and carbon monoxide.

In one aspect, which is combinable with the above embodiments and aspects, the second anode is configured to receive the off gas and output a hydrogen gas.

In one aspect, which is combinable with the above embodiments and aspects, the second anode is configured to output a hydrogen gas having a high purity.

In one aspect, which is combinable with any of the above embodiments and aspects, the second anode is configured to receive a fuel supply stream comprising a hydrocarbon fuel and water.

In one aspect, which is combinable with any of the above embodiments and aspects, the second anode is configured to internally reform the fuel supply stream.

In certain embodiments, a carbon dioxide capture system for removing carbon dioxide from a flue gas produced by a combustion power plant includes an electrolyzer cell having a first anode and a first cathode. The first cathode is configured to receive a flue gas comprising carbon dioxide and oxygen and output an enriched flue gas comprising carbon dioxide and oxygen. The carbon dioxide capture system further includes a fuel cell having a second anode and a second cathode. The second cathode is configured to receive the enriched flue gas and output a vent gas depleted of carbon dioxide.

In certain embodiments, a method for capturing carbon dioxide from a flue gas produced by a combustion power plant includes supply a flue gas comprising carbon dioxide to an electrolyzer cell and outputting a first exhaust stream comprising an enriched flue gas having carbon dioxide. The method further includes supplying the first exhaust stream to a fuel cell and outputting a second exhaust stream comprising carbon dioxide, water, hydrogen, and carbon monoxide. The second exhaust stream comprises a higher concentration of carbon dioxide than the first exhaust stream.

In one aspect, which is combinable with the above embodiment, the method for capturing the carbon dioxide further includes sequestering substantially all of the carbon dioxide from the second exhaust stream.

In one aspect, which is combinable with the above embodiments and aspects, the method for capturing the carbon dioxide further includes supplying a hydrocarbon fuel and water to the fuel cell.

In one aspect, which is combinable with the above embodiments and aspects, the method for capturing the carbon dioxide further includes outputting a hydrogen gas stream from the electrolyzer cell.

In one aspect, which is combinable with the above embodiments and aspects, the method for capturing the carbon dioxide further includes outputting a third exhaust stream from the fuel cell, the third exhaust stream being substantially depleted of carbon dioxide.

These and other advantageous features will become apparent to those reviewing the disclosure and drawings.

DETAILED DESCRIPTION

Referring generally to the figures, disclosed herein is an enhanced $CO_2$ capture system that utilizes a reformer-electrolyzer-purifier to enrich flue gas with carbon dioxide prior to its introduction into a fuel cell such that a higher energy output from the $CO_2$ capture process may be realized.

Figure 1:
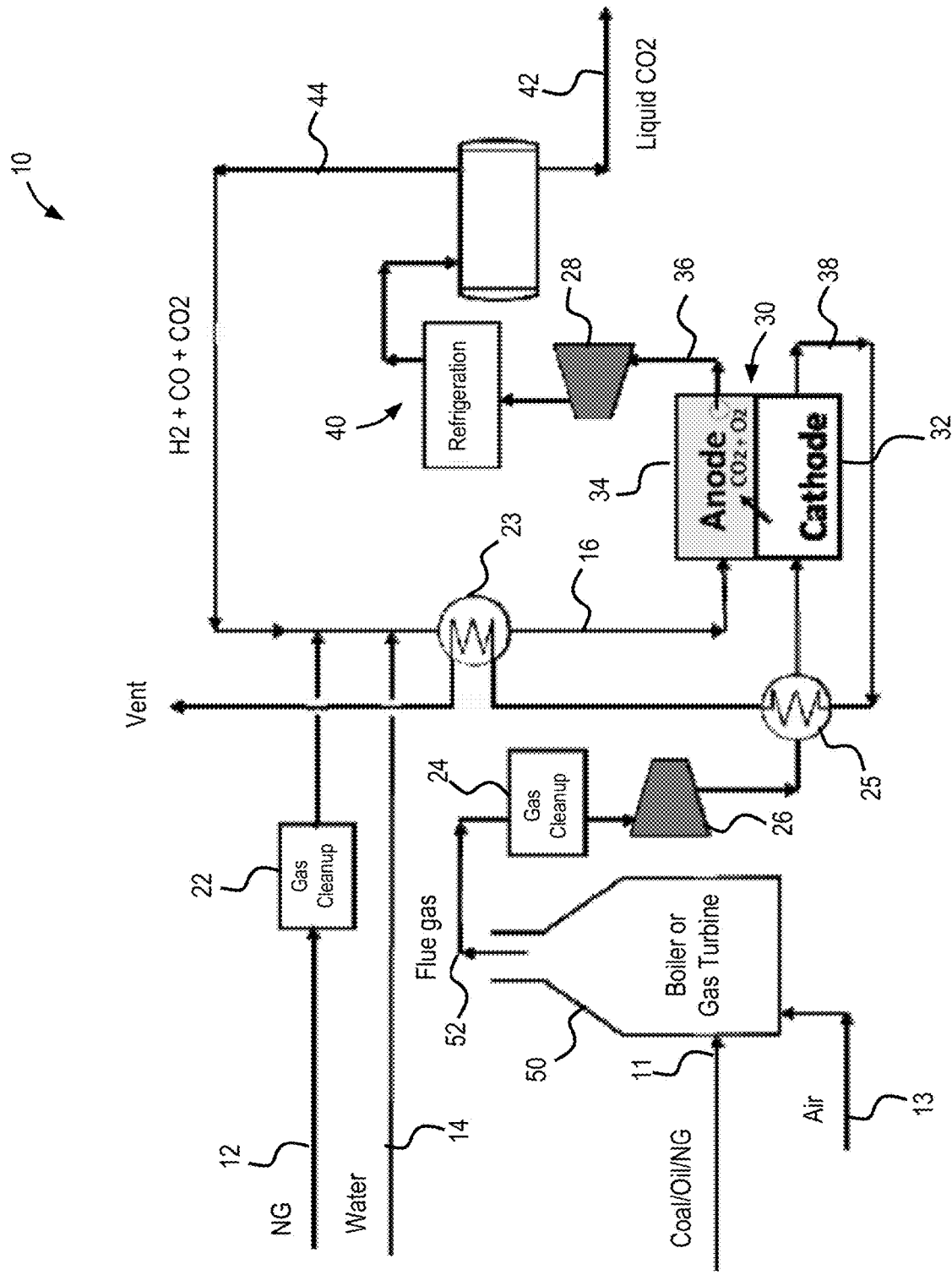
FIG. 1 shows a schematic view of a carbon capture system utilizing a fuel cell.

FIG. 1 shows a $CO_2$ capture system 10 utilizing a fuel cell in order to capture carbon dioxide contained within a flue gas stream produced by combustion power plants. Such a system is described in, for example, U.S. Pat. No. 7,396,603, which is incorporated by reference herein in its entirety. In a combustion power plant, a fossil fuel line 11 supplies a fossil fuel stream, such as coal, oil, natural gas, or other type of hydrocarbon fuel, to a combustion chamber 50, such as a boiler or gas turbine. In addition, an air supply line 13 supplies an air stream to the combustion chamber 50. The combustion reaction of the fossil fuel and air within the combustion chamber 50 produces an energy output and a flue gas stream as an exhaust. The flue gas stream contains a mixture of water, oxygen, and harmful emissions, including carbon dioxide. In particular, the flue gas stream may include carbon dioxide in a dilute concentration, which may range from about 3% to about 15%, depending on the type of fossil fuel used and the combustion process.

The flue gas stream exits the combustion chamber 50 through a flue gas line 52 where the flue gas stream is fed to a first gas cleanup station 24. The first gas cleanup station 24 is configured to remove impurities contained in the flue gas that may be harmful to the fuel cell system. A first blower 26 then directs the cleaned flue gas stream through a first heat exchanger 25 where the flue gas is heated by waste heat before being introduced into a cathode 32 of a fuel cell 30. In the embodiment shown in the Figures, the fuel cell 30 comprises a molten carbonate fuel cell (MCFC). In some embodiments, the fuel cell 30 may be configured to be capable of internally reforming the feed gas 12. Alternatively, the fuel cell 30 may receive reformed fuel from an external reformer. In addition, the fuel cell 30 may further comprise a plurality of individual cells connected to form a fuel cell stack.

As further shown in FIG. 1, a fuel supply line 12 supplies a fuel stream for the fuel cell 30. The fuel stream may comprise a hydrocarbon, such as natural gas or biogas. The fuel stream is supplied to a second gas cleanup station 22, where the fuel stream is cleaned of impurities that may be harmful to the fuel cell system. The cleaned fuel stream is then mixed with a water stream supplied by a water supply line 14 and a recycle stream of hydrogen gas, carbon monoxide, and carbon dioxide from an anode 34 of the fuel cell 30 carried by a return line 44, which will be described in more detail below. The mixed gas stream (containing the natural gas, water, hydrogen gas, carbon monoxide, and carbon dioxide) is fed through a second heat exchanger 23 via a mixed fuel line 16 where it is heated by waste heat before being introduced into the anode 34 of the fuel cell 30.

During operation of the fuel cell 30 as an MCFC unit, methane and water supplied by the mixed fuel line 16 to the anode 34 may undergo an internally reforming reaction, driven by a catalyst, to produce hydrogen and carbon dioxide. Additional hydrogen and carbon dioxide may be produced in a gas-shift reaction where water reacts with carbon monoxide. The hydrogen then reacts with carbonate ions ($CO_3^=$), which are produced by the electrochemical reaction occurring at the cathode 32 and transferred across an electrolyte layer (not shown) disposed between the cathode 32 and the anode 34. The reaction results in the production of water and carbon dioxide, which form an anode exhaust stream, and electrons, which drive the production of electricity.

In conventional uses of MCFC systems, the anode exhaust stream is recycled back to the cathode 32, where the carbon dioxide contained in the anode exhaust stream is used to support the electrochemical reactions occurring at the cathode 32. However, as shown in FIG. 1, the flue gas stream is instead used to supply the carbon dioxide needed. In particular, oxygen and carbon dioxide contained in the flue gas stream react with electrons to produce the carbonate ions that will transfer to the anode 34, completing the electrical circuit and facilitating the reactions occurring at the anode 34 for the production of electricity. The flue gas, now substantially depleted of carbon dioxide, is vented out of the system 10 as a cathode exhaust stream through a cathode exhaust line 38. Advantageously, nitrogen oxides present in the flue gas stream are largely broken up as the flue gas stream passes through the fuel cell 30 and released as nitrogen gas in the cathode exhaust stream. As shown in FIG. 1, waste heat contained in the cathode exhaust stream is used by the first exchanger 25 and the second heat exchanger 23 to heat the incoming gas streams supplied to the fuel cell 30, as described above.

As further shown in FIG. 1, the anode exhaust stream, which substantially contains water and carbon dioxide along with residual amounts of unreacted hydrogen and carbon monoxide, is removed from the fuel cell 30 through an anode exhaust line 36 by a second blower 28 to a sequester system 40. At this point, due to the electrochemical reactions of the fuel cell 30, the anode exhaust stream contains higher concentrations of carbon dioxide than the flue gas stream. In particular, the anode exhaust stream may include about 70% of carbon dioxide. This higher concentration of $CO_2$ results in an more efficient removal process of the carbon dioxide. To remove the $CO_2$, at the sequester system 40, the anode exhaust stream is cooled and water present in the stream is condensed out. The gas is then further cooled so that the bulk of $CO_2$ is condensed. The condensed carbon dioxide is then separated from the remaining gases and removed from the system 10 via a removal line 42, where the liquid $CO_2$ may be stored for other purposes. In the meantime, the remaining hydrogen, carbon monoxide, and residual carbon dioxide that was contained in the anode exhaust stream is returned to the system as an off gas through the return supply line 44, where it is mixed with the natural gas and water stream, preheated, then introduced back to the anode 34.

As mentioned above, flue gas produced by combustion power plants contain low concentrations of carbon dioxide, ranging from as low as 3% to as high as 15%. By supplying lower concentrations of oxygen and carbon dioxide to the cathode 32 of the fuel cell 30, a lower overall energy output of the fuel cell 30 is produced. As will be described in more detail below with reference to FIG. 2, by utilizing a reformer-electrolyzer-purifier (REP) cell, a higher capture of $CO_2$ from the flue gas stream and a greater energy production for the fuel cell 30 may be realized.

Figure 2:
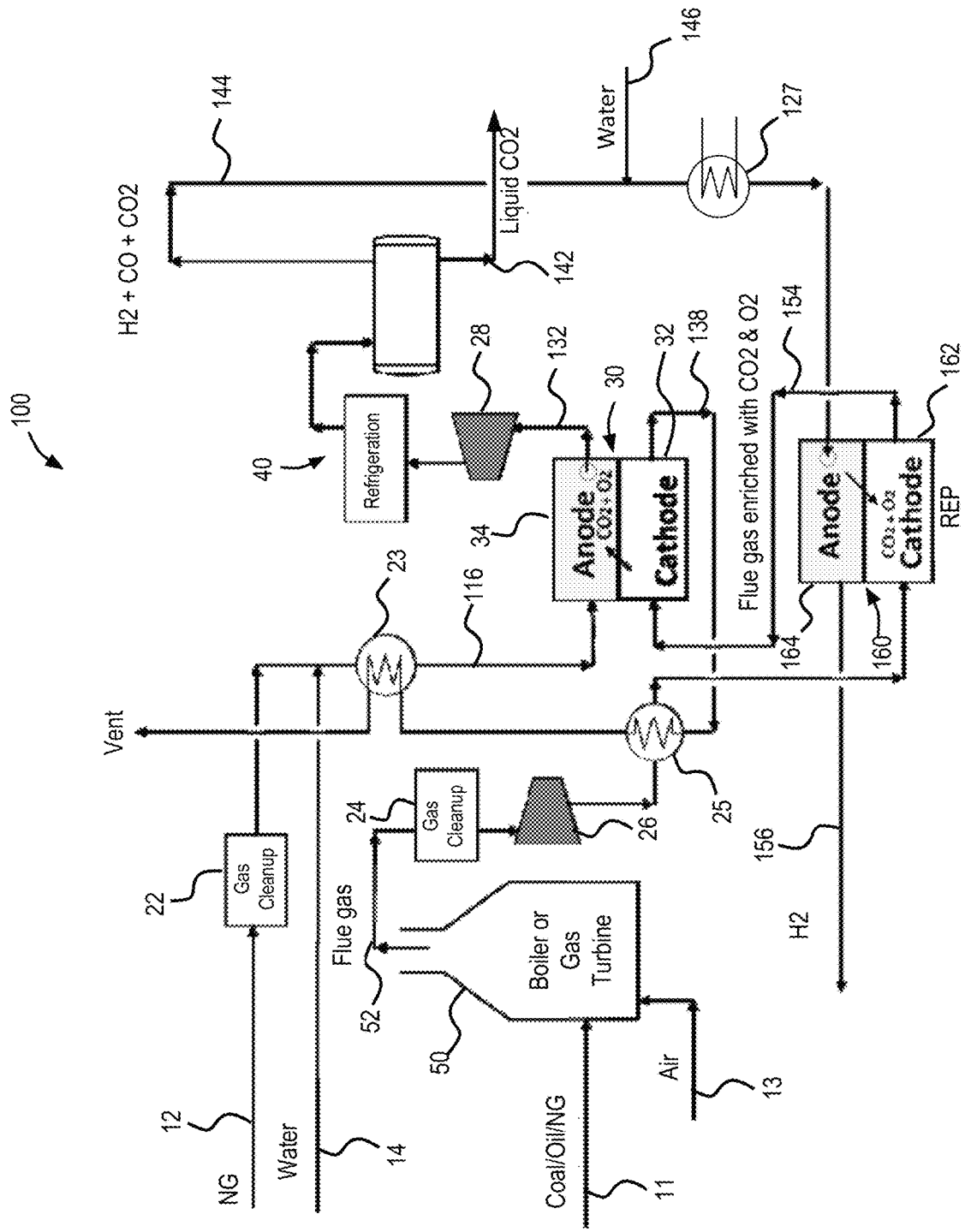
FIG. 2 shows a schematic view of a carbon capture system that incorporates a reformer-electrolyzer-purifier, according to one embodiment of the present invention.

FIG. 2 shows one embodiment of an enhanced $CO_2$ capture system 100 that incorporates an REP cell for increased $CO_2$ capture according to the present invention. An example of an REP system is described in greater detail in International Patent Application No. PCT/US2015/013837, which is incorporated by reference herein in its entirety. Similar to the $CO_2$ capture system shown in FIG. 1, a fossil fuel stream, such as coal, oil, natural gas, or other type of hydrocarbon fuel, supplied by a fossil fuel line 11, and an air stream, supplied by an air supply line 13, are introduced into a combustion chamber 50, such as a boiler or gas turbine. The combustion reaction of the fossil fuel and air within the combustion chamber 50 produces an energy output and a flue gas stream. The flue gas stream exits the combustion chamber 50 through a flue gas line 52 where the stream is fed to a first gas cleanup station 24 to strip the flue gas stream of impurities. The cleaned flue gas is directed by a first blower 26 through a first heat exchanger 25 to be heated by waste heat before being introduced into a cathode 162 of an REP cell 160, which may be an electrolyzer cell. In the embodiment shown in the Figures, the REP cell 160 is configured as a molten carbonate electrolysis cell (MCEC), which will be described in more detail below. The REP cell 160 may be internally reforming and may further comprise a plurality of individual cells to form an REP stack.

As further shown in FIG. 2, a fuel supply line 12 supplies a fuel stream for a fuel cell 30, in the form of a hydrocarbon fuel, such as natural gas or biogas. The fuel stream is first directed to a second gas cleanup station 22, where the fuel stream is cleaned of impurities that may be harmful to the fuel cell system. The cleaned fuel stream is then mixed with a water stream supplied by a water supply line 14, and the mixed gas stream containing fuel and water is fed through a second heat exchanger 23 via a mixed fuel line 116 where it is heated by waste heat before being introduced into an anode 34 of the fuel cell 30.

Due to the electrochemical reactions produced in the fuel cell 30, as described in detail above, an anode exhaust stream (second exhaust stream), which comprises a high concentration of $CO_2$ (e.g., about 70% or more), is released from the anode 34. The anode exhaust stream is fed through an anode exhaust line 132 to a second blower 28, which supplies the anode exhaust stream to a sequester system 40. Similar to the carbon capture system described above with respect to FIG. 1, the sequester system 40 cools and condenses the anode exhaust stream in order to sequester liquid $CO_2$ from the stream. The liquid $CO_2$ is removed from the system 100 via a removal line 142 where it is stored or utilized for other purposes. As shown in FIG. 2, hydrogen gas, carbon monoxide, and residual carbon dioxide is returned to the system 100 through a return line 144 and introduced into an anode 164 of the REP cell 160.

The REP cell 160 generally contains the anode 164 having a catalyst layer, a cathode 162 having a catalyst layer, and an electrolyte layer (not shown) for the transfer of ions between the anode 164 and the cathode 162. In addition, the REP cell 160 is connected to a power supply (not shown), which is configured to apply a voltage to the REP cell 160 in order to drive the internal electrochemical reactions. During operation of the REP cell 160 as an MCEC unit, the gas stream containing hydrogen, carbon monoxide, and residual carbon dioxide from the return line 144 is introduced to the anode 164. Water is also added to the gas stream in the return line 144 through a water supply line 146 and the stream is then heated by a third heat exchanger 127 before the gas stream enters the anode 164. Subsequently, an electrolysis/$CO_2$ pump reaction takes place between the carbon dioxide and water, and electrons flowing to the anode 164 due to the voltage applied by the power supply, resulting in the production of hydrogen and carbonate ions. The carbonate ion gas ($CO_3^=$) produced at the anode 164 is pumped out of the REP cell 160 through the electrolyte layer. Mostly $H_2$ from the feed gas and from the electrolysis reaction at a high purity exits via hydrogen line 156 (third exhaust stream), where it is used to offset the energy needs of the fuel cell 30 or exported for other purposes. In certain embodiments, the purity of the $H_2$ exiting from the REP cell 160 is at levels of 95% or greater. Meanwhile, the carbonate ions are transferred across the electrolyte layer to the cathode 162, where the ions convert to oxygen, carbon dioxide and electrons. The electrons flow from the cathode to the power supply and complete the electrical circuit. Thus, the transfer of the carbonate ions ($CO_3^=$) together with the subsequent reaction at the cathode 162 has the effect of pumping oxygen and carbon dioxide out of the return line gas stream. Because the flue gas stream is flowing through the cathode 162, the carbon dioxide and oxygen pumped out by the electrolysis reaction is introduced into the flue gas stream, resulting in a flue gas stream enriched with greater concentrations of oxygen and carbon dioxide.

As shown in FIG. 2, the enriched flue gas stream (first exhaust stream) is carried out of the REP cell 160 through a fuel cell supply line 154 to supply the necessary carbon dioxide and oxygen for the cathode 32 of the fuel cell 30, where the oxygen and carbon dioxide present in the enriched stream is used to drive the internal reactions for the production of electricity, as described in detail above. However, because the enriched flue gas stream now contains higher concentrations of $O_2$ and $CO_2$, a higher output of energy can be realized from the fuel cell 30. As further shown in FIG. 2, the cathode 32 of the fuel cell 30 outputs a vent gas 138 (fourth exhaust stream) that passes through the first heat exchanger 25 and the second heat exchanger 23 to heat the flue gas and the fuel stream supplied to the fuel cell 30 before being vented out of the system. This vent gas, compared to the flue gas outputted from the combustion chamber 50, is substantially depleted of carbon dioxide.

In addition, additional energy output is realized through the REP cell 160 via its production of high purity hydrogen gas, which may be used as fuel to the fuel cell 30 and/or exported from the system for other energy uses. Moreover, the residual carbon dioxide returned from the sequester system is introduced to the REP cell 160 to be recycled back into the flue gas stream and subsequently removed by the fuel cell. Thus, an enhanced and efficient $CO_2$ capture system may be realized in which $CO_2$ capture is increased and an energy output (hydrogen) from the removal process can be realized, thereby improving the production capabilities of the power plant while reducing harmful $CO_2$ emissions.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A carbon dioxide capture system for removing carbon dioxide from a flue gas produced by a combustion power plant, comprising:
 a molten carbonate electrolysis cell comprising an electrolysis cell anode and an electrolysis cell cathode;
 a molten carbonate fuel cell comprising a fuel cell anode and a fuel cell cathode;
 a flue gas supply line connected to the electrolysis cell cathode and configured to supply the flue gas received from the combustion power plant;

a first exhaust stream connection line connected to the electrolysis cell cathode and to the fuel cell cathode; and a second exhaust stream connection line connected to the fuel cell anode;

wherein the electrolysis cell cathode is configured (i) to receive the flue gas from the flue gas supply line, and (ii) to output a first exhaust stream to the first exhaust stream connection line such that the first exhaust stream comprises a first concentration of carbon dioxide that is greater than a concentration of carbon dioxide in the flue gas;

wherein the fuel cell cathode is configured to receive the first exhaust stream from the first exhaust stream connection line; and wherein the fuel cell anode is configured to output a second exhaust stream to the second exhaust stream connection line such that the second exhaust stream comprises a second concentration of carbon dioxide that is greater than the first concentration of carbon dioxide.

2. The system according to claim 1, wherein the flue gas further comprises oxygen and the first exhaust stream further comprises oxygen, and wherein the first exhaust stream comprises a higher concentration of oxygen than the flue gas.

3. The system according to claim 1, further comprising a third exhaust stream connection line connected to the electrolysis cell anode, wherein the electrolysis cell anode is configured to output a third exhaust stream comprising hydrogen to the third exhaust stream connection line.

4. The system according to claim 3, wherein the electrolysis cell anode is configured to output the third exhaust stream such that the third exhaust stream comprises at least 95% hydrogen.

5. The system according to claim 3, wherein the third exhaust stream connection line is connected to the fuel cell anode, and the fuel cell anode is configured to receive the third exhaust stream from the third exhaust stream connection line.

6. The system according to claim 1, wherein the fuel cell anode is configured to output the second exhaust stream such that the second exhaust stream comprises about 70% carbon dioxide.

7. The system according to claim 1, further comprising a sequester system connected to the second exhaust stream connection line, wherein the sequester system is configured to receive the second exhaust stream from the second exhaust stream connection line and configured to cool and condense the second exhaust stream such that liquid carbon dioxide is produced.

8. The system according to claim 3, further comprising a fourth exhaust stream connection line connected to the molten carbonate fuel cell cathode, wherein the fuel cell is configured to output a fourth exhaust stream to the fourth exhaust stream connection line such that the fourth exhaust stream is substantially depleted of carbon dioxide.

9. A method for removing carbon dioxide from a flue gas produced by a combustion power plant, the method comprising:

providing a carbon dioxide capture system comprising:
a molten carbonate electrolysis cell comprising an electrolysis cell anode and an electrolysis cell cathode,
a molten carbonate fuel cell comprising a fuel cell anode and a fuel cell cathode,
a flue gas supply line connected to the electrolysis cell cathode and configured to supply the flue gas received from the combustion power plant,
a first exhaust stream connection line connected to the electrolysis cell cathode and to the fuel cell cathode, and
a second exhaust stream connection line connected to the fuel cell anode;

receiving at the electrolysis cell cathode the flue gas from the flue gas supply line;

outputting from the electrolysis cell cathode a first exhaust stream to the first exhaust stream connection line such that the first exhaust stream comprises a first concentration of carbon dioxide that is greater than a concentration of carbon dioxide in the flue gas;

receiving at the fuel cell cathode the first exhaust stream from the first exhaust stream connection line; and outputting from the fuel cell anode a second exhaust stream to the second exhaust stream connection line such that the second exhaust stream comprises a second concentration of carbon dioxide that is greater than the first concentration of carbon dioxide.

10. The method according to claim 9, further comprising a third exhaust stream connection line connected to the electrolysis cell anode, wherein the electrolysis cell anode outputs a third exhaust stream comprising hydrogen to the third exhaust stream connection line.

11. The method according to claim 10, wherein the electrolysis cell anode outputs the third exhaust stream such that the third exhaust stream comprises at least 95% hydrogen.

12. The method according to claim 10, wherein the third exhaust stream connection line is connected to the fuel cell anode, and the fuel cell anode is configured to receive the third exhaust stream from the third exhaust stream connection line.

13. The method according to claim 9, further comprising:
providing a sequester system connected to the second exhaust stream connection line, wherein the sequester system receives the second exhaust stream from the second exhaust stream connection line and cools and condenses the second exhaust stream such that liquid carbon dioxide is produced.

* * * * *